Feb. 1, 1949.  E. K. METZNER  2,460,706
RECTIFICATION
Filed May 19, 1947
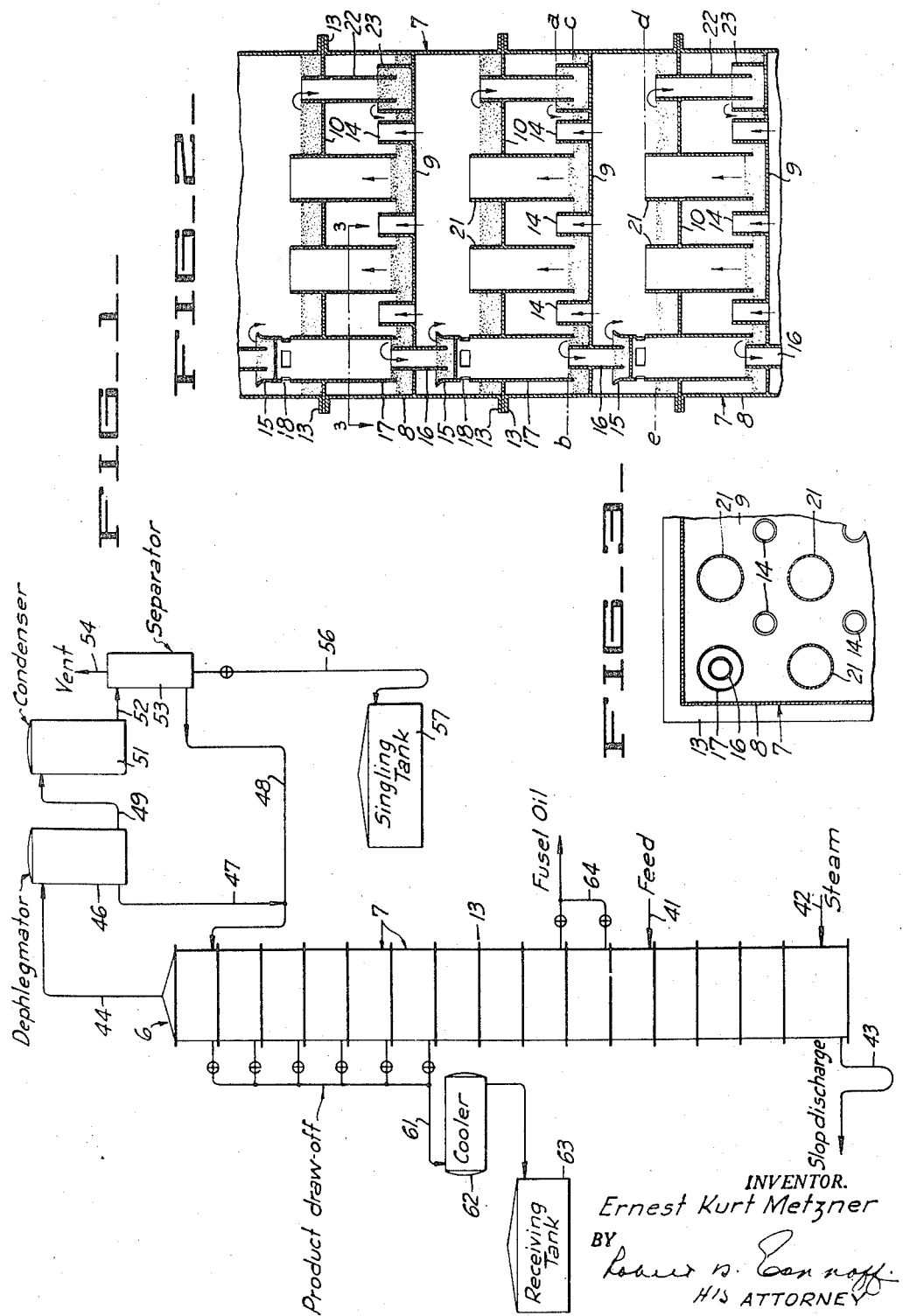
INVENTOR.
Ernest Kurt Metzner
BY
HIS ATTORNEY Patented Feb. 1, 1949

2,460,706

UNITED STATES PATENT OFFICE 2,460,706

RECTIFICATION

Ernest Kurt Metzner, Los Angeles, Calif.

Application May 19, 1947, Serial No. 749,045

8 Claims. (Cl. 261—108)

This invention relates to an improvement in the art of distillation and particularly to an improved plate construction for use in a rectification column.

To separate a volatile liquid composed of two or more miscible components into fractions corresponding to such components, it is usual to distill the liquid. This operation includes the use of a rectification column or an equivalent structure therein by causing the mixture to vaporize by suitable application of heat, condensing the vapor in such a way that fractions of varying boiling points are obtained, revaporizing these fractions and separating the vapors into similar fractions, combining fractions of similar boiling points, and repeating until the desired degree of separation is finally obtained. Such a column includes one or more plates, the function of each of which is to effect interaction of (1) vapor bubbles with a liquid on the plate, (2) vapor with free surface of the liquid and (3) vapor with liquid drops in the vapor space above the plate. Each plate in the rectification column therefore includes suitable means for bringing descending liquid into contact with ascending vapor so that adequate heat exchange contact can be effected between the two and so that the concentration of each component on each plate will vary until, at opposite ends of the column, one component is present and the other is absent, e. g., the more volatile component is present at the top of the column and the less volatile component is present at the bottom of the column.

Of course, the foregoing applies only to the simplest system and in a multi-component system one or more of the other components may be present as well.

The usual and commonest form of device for effecting contact between the liquid and gas phase on a plate in a rectification column is the so-called bubble cap. This includes an inverted cup-like structure mounted over the end of a vertically positioned tubular riser extending upwardly from each plate. Ascending vapor is deflected by the cap downwardly into contact with the liquid standing on the plate, the lip of the cup being serrated to force the vapor into contact with the liquid surface; excess liquid drains off the plate through a separately provided liquid overflow, which is sealed by the liquid on the lower plate. To be effective and to be sure that vapor does not blow past, each bubble cap must seat accurately upon its riser and each plate must extend horizontally. In actual practice this is difficult to attain. From an efficiency standpoint, the bubble cap is not satisfactory and for this reason a bubble cap equipped column must generally be utilized with many more plates than are indicated by theoretical design considerations. The use of the riser-bubble cap contact means inherently provides other limitations upon rectification in that the pressure drop through each of these is relatively high. As a result, the differential across the rectification column becomes considerable as the column is increased in size so that the operating pressure is increased undesirably.

In the distillation of alcoholic liquids, it is usual to fabricate the distillation equipment from copper because this material possesses good heat exchange properties and the copper salts formed are usually soluble in the liquid phase. Iron containing materials cannot usually be employed because of the corrosive effect of the alcoholic liquids upon these and because iron salts are undesirable in the distilled product. In accordance with the present invention, I provide a rectification column and particularly a plate construction which can be fabricated from any suitable material including an iron containing material such as ordinary mild steel plate. By first fashioning the rectification column and the plates in accordance with this invention, the several components of the rectification system can thereafter be coated with a suitable material which is inert to the substances undergoing rectification. In this manner, I am able, for example, to utilize iron containing material and, at the same time, provide equipment which is inert to the components undergoing rectification so that, in effect, I provide a rectification system which possesses the structural strength of the usual iron containing materials of construction, and which is nevertheless inert to the several components. In addition, the rectification plate construction characteristic of this invention is also such that the pressure drop through the rectification column is materially reduced and, as compared to a column of like capacity utilizing the usual bubble-cap and riser construction, the over-all pressure drop is materially reduced.

A further feature of the present invention is in the utilization of a plate or plates which are non-circular in outline, e. g. square or rectangular. A circular plate is subject to a channel effect and possible short circuiting of the liquid flowing into the plate. By utilizing a square or rectangular plate in conjunction with other construction features characterizing the rectification column of this invention, these defects are corrected.

It is in general the broad object of the present invention to provide an improved rectification plate construction.

Another object of the present invention is to provide an improved rectification column construction.

Another object of the present invention is to provide an improved rectification plate which can be fashioned of an iron containing material such as steel or the like, then coated with a corrosion resistant coating and then assembled.

The invention includes other objects and features of advantage, some of which, together with the foregoing, will appear hereinafter wherein the present preferred form of rectification plate construction and the column of this invention are disclosed, together with a typical mode of its utilization.

Referring to the drawing,

Figure 1 is a schematic representation of a suitable apparatus and a flow sheet which can be employed in conjunction with the rectification plate construction of this invention.

Figure 2 is a side elevation partly in section through a typical plate construction embodying the present invention and showing liquid standing on the several plates.

Figure 3 is a fragmentary section taken along the line 3—3 of Figure 2 and showing the construction of a corner portion of a column embodying the invention.

Referring particularly to Figure 1 in the drawing, I have indicated generally by numeral 6 a suitable rectification column having a plurality of separate rectifying sections 7. In the form shown and referring particularly to Figure 2, each section 7 includes an annular shell member 8 having a flange 13 at each end thereof. A first or lower plate 9 is provided intermediate the ends of each shell member 8 while a second or upper plate 10 is mounted on the flanged upper end of the shell member and is retained between the adjacent flanges 13 of the adjacent shell members by suitable studs or bolts (not shown). The rectification column is provided by the assembly of a plurality of the separate sections 7, each section including a shell 8, a first plate 9 and a second plate 10.

Each plate 9 includes a plurality of vapor riser tubes 14 spaced about the plate, each tube being flush wtih the lower side of the plate 9 and extending upwardly to elevation $a$ which is above elevation $c$, the normal surface of the liquid (indicated by the stippling in Figure 2) standing on the plate. Also mounted upon each plate 9 is a liquid drain tube 16 which depends from the plate 9 to drain liquid standing on the plate to the next lower adjacent plate 10; the upper end of each liquid drain tube 16 stands above its supporting plate 9 at elevation $b$ which is nearly equal to but is less than the elevation $a$ of each of the vapor riser tubes 14 above the supporting plate; elevation $a$ is greater than elevations $b$ and $c$ and elevation $b$ is also greater than elevation $c$. Liquid passing through drain tube 16 is discharged into a cup 15 formed on the upper end of a vertical tube 17 from which it overflows onto lower plate 10. Each tube 17 is arranged concentrically with respect to each drain tube 16, the lower end of each tube 17 being slightly below the upper end of the drain tube and at elevation $c$. The upper end of each tube 17 is slotted as at 18 to avoid creation of a vapor-lock in the tube 17.

Mounted upon each plate 10 are a plurality of vapor-liquid contact tubes 21 which extend on both sides of the plate 10, from elevation $d$, above the normal level of liquid standing on plate 10 (elevation $e$), to elevation $c$, the normal level of liquid standing on plate 9. A liquid drain tube 22 is provided on each plate 10 through which liquid drains into a cup 23 standing on the next lower plate 9 and releasing liquid onto that plate at elevation $a$.

Vapor-liquid contact tubes 21 are usually arranged symmetrically about the vapor tubes 14 as is shown in Figure 3. The tube 17 is a special adaptation of one of the vapor-liquid contact tubes in that it carries the cup 15 and is slotted as at 18. Usually the tube 17 and the drain 22 are spaced as far apart on a plate as is feasible. Each section in the column is constructed in the same manner, the top or uppermost plate being a plate 10 and the lowermost plate being a plate 9.

The construction of the plates and their function will become further apparent upon the following brief description of the operation in fractionating a volatile liquid composed of two volatile miscible components having different boiling points. Assuming that the plates are in a rectification column operated at such a temperature that normally a liquid stands upon each of the plates while a vapor is passing upwardly through the column, the liquids will normally stand on each plate 10 at elevation $e$, that at which the upper end of drain tube 22 stands above the plate; any liquid collecting on plate 10 drains down through the drain 22 into cup 23 and onto plate 9. Similarly, any liquid collecting on plate 9 above elevation $c$, the distance at which the liquid drain 16 stands above plate 9, will drain down to the next lower plate 10. Vapors ascending through the tower pass upwardly through vapor passages 14 to the space between the liquid on each plate 9 and the bottom of the immediately next-adjacent plate 10. This vapor comes into heat exchange contact with the under side of plate 10 and the liquid on plate 9; as a consequence, temperature equilibrium is substantially established between the vapor and the liquid standing on plate 10. The vapor is also brought into contact with the liquid standing on the plate 9 because, to pass upwardly, the vapor must pass through the liquid standing in each tubular riser or boiling tube 21 for these depend below the liquid surface on the plate 9 as established by drain 16. As a consequence, the liquid and vapor are brought into intimate scrubbing contact in each riser 21 for the vapor, to ascend, must break and pass the liquid seal in each riser 21. As a consequence, the vapor wets the surface of the riser as it passes upwardly, thus bringing the gas-liquid phases into heat-exchange contact. This ensures that the vapor is brought into contact with the ($a$) free surface of the liquid on each plate 9, ($b$) the liquid standing on the plate, and ($c$) with the liquid drops in the vapor space between plates 9 and 10, to enter into the vapor space between the plates.

In the vapor space between a lower plate 10 and the next upper plate 9, the liquid and vapor separate, the vapor rising through risers 14 and the liquid draining off the plate 10 to the next lower plate 9 through drain 22. In this way, adequate heat exchange is attained between the two phases and the two phases are separated. Thus a column containing a plurality of plates 9 and of plates 10 will include a plurality of alternate vapor-liquid contact regions (plate 9 and tubes 17 and 21) and a plurality of liquid-vapor separation regions.

The back pressure provided by the rectification column can be predetermined and can be held at any desired value by adjusting the distance which the tubular risers 21 depend beneath the liquid level on each plate 9; in other words, as the distance which the lower end of the risers 17 depend into the liquid on each plate 9 is decreased, the pressure drop through the rectification column can be reduced to a desired extent.

Observing plates 9 and 10, I wish to point out that each of these is a simple plate structure having a plurality of tubular elements thereon. Thus, each plate and its elements can be separately fashioned in a simple manner and successive plates readily assembled merely by placing them in proper juxtaposition, the whole being secured to provide a final rectification column containing the desired number of plates by bolting together the desired number of plates 10 and members 7. By utilizing a square or a rectangular plate one can obviate any possibility of liquid short-circuiting on a plate. In this connection, drain tubes 16 are usually placed in a plate corner diagonally opposite to drain tubes 22 so that the liquid must flow across the plate and its shortest path is the plate diagonal.

A rectification column constructed of the plates of this invention can be utilized in any desired manner. For example, referring particularly to Figure 1, I have shown column 6 supplied continuously with a suitable alcohol feed liquor through pipe 41 at an intermediate plate. Steam is supplied at the bottom of the column by pipe 42 while waste material is taken off at the bottom of the column through pipe 43 for slop discharge. Vapors passing overhead from the column are taken off through vapor line 44 and are sent to a dephlegmator 46. The liquid product from the dephlegmator is returned through line 47 to reflux line 48, the reflux being returned to one of the uppermost plates in the column. The vapors released from the dephlegmator are passed through line 49 into a condenser 51, the vapor and liquid products being delivered from this to line 52 to a separator 53 and which includes a suitable gas vent 54. A portion of the liquid from the separator is taken off through line 48 while the remainder is sent through line 56 to a tank 57. The product draw-off is taken off from one or more of a plurality of plates 10 in an upper portion of the column into line 61', thence to cooler 62 and receiving tank 63. In the case of an alcohol product, the undesirable fusel oil is taken off at intermediate plates as through draw-offs 64.

In place of the system utilized, one can employ the plate construction disclosed in any number and in any other continuous or batch system.

From the foregoing, I believe it will be apparent that I have provided a novel and simple form of improved rectification plate construction.

I claim:

1. In a rectification column, a second plate and a first plate parallel to and immediately below said second plate, said second plate having a plurality of boiling tubes extending from a first elevation above one side of said second plate and terminating adjacent to but spaced from the first plate, a first liquid drain tube extending from above the second plate for discharging liquid onto said first plate, a vapor tube supported in the first plate for discharging vapor from below said first plate to between the second and first plates at an elevation above the level of liquid normally standing on said first plate, and a second liquid drain tube for draining liquid from the first plate at an elevation below that of the vapor discharge tube and above the elevation of the lower end of the boiling tubes above said first plate.

2. In a rectification column, a second horizontal plate and a first horizontal plate parallel to and immediately below said second plate, said second plate having a plurality of boiling tubes extending from a first elevation above one side of said second plate and terminating at a second elevation adjacent to but spaced from the first plate, a first liquid drain tube extending from a third elevation which is below said first elevation and above the second plate for discharging onto said first plate at a fourth elevation, a vapor tube supported on the first plate for discharging vapor from below said first plate to between the second and first plates at an elevation above the level of liquid normally standing on said first plate, and a second liquid drain tube for draining liquid from the first plate at a fifth elevation which is below said fourth elevation and above the second elevation.

3. In a rectification column, a second plate and a first plate parallel to and immediately below said second plate, each of said plates being substantially rectangular in horizontal outline, said second plate having a plurality of boiling tubes extending from a first elevation above one side of said second plate and terminating adjacent to but spaced from the first plate, a first liquid drain tube in one corner of said second plate and extending from above the second plate for discharging liquid onto said first plate, a vapor tube supported in the first plate for discharging vapor from below said first plate to between the second and first plates at an elevation above the level of liquid normally standing on said first plate, and a second liquid drain tube in a corner diagonally spaced from said first corner for draining liquid from the first plate at an elevation below that of the vapor discharge tube and above the elevation of the lower end of the boiling tubes above said first plate.

4. In a rectification column, a second horizontal plate and a first horizontal plate parallel to and immediately below said second plate, each of said plates being substantially rectangular in horizontal outline, said second plate having a plurality of boiling tubes extending from a first elevation above one side of said second plate and terminating at a second elevation adjacent to but spaced from the first plate, a first liquid drain tube in one corner of said second plate and extending from a third elevation which is below said first elevation and above the second plate for discharging onto said first plate at a fourth elevation, a vapor tube supported on the first plate for discharging vapor from below said first plate to between the second and first plates at an elevation above the level of liquid normally standing on said first plate, and a second liquid drain tube in a corner diagonally spaced from said first corner for draining liquid from the first plate at a fifth elevation which is below said fourth elevation and above the second elevation.

5. In a rectification column, a second plate and a first plate parallel to and immediately below said second plate, said second plate having a plurality of boiling tubes extending from a first elevation above one side of said second plate and terminating adjacent to but spaced from the first plate, a first liquid drain tube extending from above the second plate for discharging liquid onto said first plate, a vapor tube supported in the first plate for discharging vapor into a region between the second and first plates at an elevation above the level of liquid normally standing on said first plate, and a second liquid drain tube for draining liquid from the first plate at an elevation below that of the vapor discharge tube and above the elevation of the lower end of the boiling tubes above said first plate.

6. In a rectification column, a second horizontal plate and a first horizontal plate parallel to and immediately below said second plate, each of said plates being substantially rectangular in horizontal outline, said second plate having a plurality of boiling tubes extending from a first elevation above one side of said second plate and terminating at a second elevation adjacent to but spaced from the first plate, a first liquid drain tube in one corner of said second plate and extending from a third elevation which is below said first elevation and above the second plate for discharging onto said first plate at a fourth elevation, a vapor tube supported on the first plate for discharging vapor into a region between the second and first plates at an elevation above the level of liquid normally standing on said first plate, and a second liquid drain tube in a corner diagonally spaced from said first corner for draining liquid from the first plate at a fifth elevation which is below said fourth elevation and above the second elevation.

7. In a rectification column, a second plate and a first plate parallel to and immediately below said second plate, said second plate having a plurality of boiling tubes extending from a first elevation above one side of said second plate and terminating adjacent to but spaced from the first plate, a first liquid drain tube extending from above the second plate for discharging liquid onto said first plate, a vapor tube supported on the first plate for discharging vapor from below said first plate to between the second and first plates at an elevation above the level of liquid normally standing on said first plate, a second liquid drain tube for draining liquid from the first plate at an elevation below that of the vapor discharge tube and above the elevation of the lower end of the boiling tubes above said first plate, and a cup provided on an upper end of a boiling tube for receiving liquid from said second drain tube for discharging the liquid onto the second plate.

8. In a rectification column, a second plate and a first plate parallel to and immediately below said second plate, each of said plates being substantially rectangular in horizontal outline, said second plate having a plurality of boiling tubes extending from a first elevation above one side of said second plate and terminating adjacent to but spaced from the first plate, a first liquid drain tube in one corner of said second plate and extending from above the second plate for discharging liquid onto said first plate, a vapor tube supported on the first plate for discharging vapor from below said first plate to between the second and first plates at an elevation above the level of liquid normally standing on said first plate, and a second liquid drain tube in a corner diagonally spaced from said first corner for draining liquid from the first plate at an elevation below that of the vapor discharge tube and above the elevation of the lower end of the boiling tubes above said first plate, and a cup provided on an upper end of a boiling tube for receiving liquid from said second drain tube for discharging the liquid onto the second plate.

ERNEST KURT METZNER.

REFERENCES CITED

The following references are of record in the file of this patent:

UNITED STATES PATENTS

| Number | Name | Date |
|---|---|---|
| 1,567,456 | Newton | Dec. 29, 1925 |
| 1,688,515 | Baker | Oct. 23, 1928 |
| 2,048,145 | Sillers | July 21, 1936 |
| 2,048,179 | Chandler, Jr. | July 21, 1936 |
| 2,078,284 | Sherman | Apr. 27, 1937 |

FOREIGN PATENTS

| Number | Country | Date |
|---|---|---|
| 4,324 | Great Britain | Mar. 19, 1890 |